(12) United States Patent
Daikai et al.

(10) Patent No.: US 6,534,578 B1
(45) Date of Patent: Mar. 18, 2003

(54) RUBBER COMPOSITIONS, RUBBER-RESIN LAMINATES AND FLUID-IMPERMEABLE HOSES

(75) Inventors: Eiichi Daikai, Inuyama (JP); Koji Senda, Niwa-gun (JP)

(73) Assignee: Tokai Rubber Industries, Ltd., Komaki (JP)

( * ) Notice: Subject to any disclaimer, the term of this patent is extended or adjusted under 35 U.S.C. 154(b) by 216 days.

(21) Appl. No.: 09/627,116

(22) Filed: Jul. 27, 2000

(30) Foreign Application Priority Data

Aug. 6, 1999 (JP) .......................... 11-223361

(51) Int. Cl.⁷ ................................ C08K 5/13
(52) U.S. Cl. .................. 524/323; 524/342; 524/346; 524/348; 524/574; 524/567; 525/145
(58) Field of Search ................... 524/323, 342, 524/346, 348, 574, 567

(56) References Cited

U.S. PATENT DOCUMENTS

| | | | |
|---|---|---|---|
| 4,101,478 A | 7/1978 | Kostjuchenko et al. ... | 260/23 S |
| 5,348,779 A | 9/1994 | Igarashi ..................... | 428/36.7 |
| 5,488,974 A | * 2/1996 | Shiota et al. ............... | 138/125 |

FOREIGN PATENT DOCUMENTS

| | | | |
|---|---|---|---|
| JP | 61 120842 | 6/1986 | |
| JP | 7-117178 | 5/1995 | ............ F16L/11/08 |
| JP | 7-171906 | 7/1995 | ............ B29D/23/00 |
| JP | 7-173349 A | 7/1995 | ............ C08K/5/44 |
| JP | 8-034886 A | 2/1996 | ............ C08L/23/22 |
| JP | 8-118547 A | 5/1996 | ............ B32B/25/08 |
| JP | 9-53767 | 2/1997 | ............ F16L/11/08 |
| JP | 10-2465 | 1/1998 | ............ F16L/11/08 |
| JP | 10-16138 | 1/1998 | ............ B32B/25/16 |
| JP | 2787376 | 6/1998 | ............ C08L/3/22 |
| WO | WO9103519 | 3/1991 | ............ C08L/23/22 |

* cited by examiner

Primary Examiner—David W. Wu
Assistant Examiner—William Cheung
(74) Attorney, Agent, or Firm—Jacobson Holman PLLC

(57) ABSTRACT

A refrigerant hose for an air conditioner has an inner wall layer formed of a laminate of an inner resin layer and an outer rubber layer bonded by its vulcanization to the resin layer. The rubber layer is of a composition comprising butyl rubber, an adhesive material based on resorcinol and a vulcanizing agent based on an alkylphenol-formaldehyde resin, and having a bromine content of at least 0.5% by weight. The hose having the inner wall layer surrounded by a reinforcing layer and an outer wall layer exhibits a high adhesive strength even at an elevated temperature between its refrigerant-impermeable resin layer and its water-impermeable rubber layer.

20 Claims, 1 Drawing Sheet

RUBBER COMPOSITIONS, RUBBER-RESIN LAMINATES AND FLUID-IMPERMEABLE HOSES

BACKGROUND OF THE INVENTION

1. Field of the Invention

This invention relates to a water-impermeable rubber composition which is highly adhesive to a refrigerant gas-impermeable resin even at a high temperature without the aid of any adhesive layer. It also relates to a rubber-resin laminate formed by adhesion using such a rubber composition, and having high impermeability to both water and a refrigerant gas. It further relates to a fluid-impermeable hose having an inner wall layer formed of such a laminate.

2. Description of the Related Art

A hose used for transporting a refrigerant in an air-conditioning system for an automobile or a room, or the like usually has a wall having an inner layer, an outer layer and a reinforcing layer disposed therebetween. There has recently been made a change in the refrigerant to be used in an air-conditioning system from, for example, what is known as R-12 to R-134, with a resultant change in the rerigerator oil to be used. These changes have brought about a demand for a refrigerant hose having a double inner wall layer formed of an inner layer of a resin which is impermeable to a refrigerant gas, and an outer layer of rubber which is impermeable to water. If those two layers are poorly adhesive to each other, the refrigerant gas is likely to collect therebetween, resulting in the separation of the layers as a defect of a fluid-impermeable hose. Therefore, an adhesive is used to bond the two layers more tightly together. The use of an adhesive, however, gives rise to a number of problems including environmental contamination by the solvent of the adhesive.

Thus, there have been proposed various hoses having a rubber layer and a resin layer adhered without the aid of an adhesive layer, through mixing an adhesive material in the rubber composition during the process of vulcanization. For example, Japanese Patent Application Laid Open No. 117178/1995 discloses a composite flexible hose having in its wall an intermediate layer of rubber formed of a composition containing a mixture of butyl rubber and halogenated butyl rubber, a brominated alkylphenol-formaldehyde resin (Br-APF) as a resinous vulcanizing agent and silicic acid or a salt thereof as an adhesive material. The adhesive material makes the rubber layer adhesive to the innermost layer of a modified polyamide resin. Japanese Patent Application Laid-Open No. 16138/1998 discloses a gas-impermeable reinforced hose having an inner wall layer formed of an inner layer of a modified polyamide resin, an intermediate layer of halogenated butyl rubber and an outer layer of an ethylene-α-olefin-unconjugated diene copolymer. The halogenated butyl rubber contains Br-APF and a modified liquid polyisoprene as an adhesive material.

When any such hose is used in, for example, an air-conditioning system for an automobile, it is exposed to a high temperature, since it is usually installed in its engine compartment. The high adhesion between its rubber and resin wall layers, required in an environment having a normal temperature, is all the more necessary in environments having an elevated temperature. Those layers, however, usually have smooth curved surfaces which are not easy to keep adhering to each other, particularly at a high temperature. The inventors of this invention have found from research work that the adhesion between the polyamide resin layer and rubber layer of the hoses as disclosed in the two Japanese patent applications cited above is satisfactory in an environment at a normal temperature, but not at an elevated temperature.

SUMMARY OF THE INVENTION

It is, therefore, an object of this invention to provide a rubber composition which can form a water-impermeable rubber layer adhering satisfactorily even at a high temperature to a refrigerant gas-impermeable resin layer without relying upon any particular adhesive layer.

It is another object of this invention to provide a rubber composition which can form a layer having a smooth curved surface and adhering satisfactorily even at a high temperature to a resin layer having a smooth curved surface without relying upon any particular adhesive layer through an adhesive material mixing procedure.

It is still another object of this invention to provide an advantageous laminate of rubber and resin layers remaining firmly adherent to each other even at a high temperature without having any adhesive layer formed therebetween, through an adhesive material mixing step.

It is a further object of this invention to provide a hose having an impermeable wall formed by a laminate of rubber and resin layers remaining firmly adherent to each other even at a high temperature without having any adhesive layer formed therebetween.

According to a first aspect of this invention, there is, thus, provided a rubber composition comprising as a base material at least one rubber selected from the group consisting of butyl rubber (IIR) and halogenated butyl rubber (halogenated IIR), 0.5 to 5 parts by weight of at least one resorcinol compound as an adhesive material per 100 parts by weight of the base material and 3 to 15 parts by weight of at least one vulcanizing agent selected from the group of consisting of an alkylphenol-formaldehyde resin (APF) and a brominated alkylphenol-formaldehyde resin (Br-APF) per 100 parts by weight of the base material, wherein the composition contains at least 0.5% by weight of bromine.

The rubber composition according to the first aspect of this invention can form a rubber layer remaining firmly adherent to a polyamide or polyester resin layer even at a high temperature. A refrigerant hose, as in an air-conditioning system, requires a high adhesion between its rubber and resin wall layers at a high temperature. If their adhesion is not satisfactory, their separation is likely to occur upon creation of a negative pressure in the hose at a high temperature. In this connection, the rubber composition according to this aspect is very useful. The adhesion at a high temperature in the context of this specification differs from an adhesive strength after hot air aging as discussed in Japanese Patent Application Laid-Open No. 117178/1995.

A rubber composition containing a smaller amount of adhesive material or of bromine than that stated above fails to form a satisfactorily adhesive layer at a high temperature. A composition containing a smaller amount of vulcanizing agent than stated above fails to form a vulcanized product having satisfactory physical properties. A composition containing a larger amount of adhesive material or vulcanizing agent than the range stated above is less easy to extrude and work with because of too rapid scorching.

The composition according to this aspect does not require any particular adhesive to ensure its adhesion to a resin layer, since the adhesive material which has been mixed in ensures its firm adhesion even at a high temperature. The adhesive material also ensures a firm adhesion of a layer of the composition to a reinforcing layer formed around it of yarns treated with RFL (resorcinol/formalin/latex), since it is highly reactive with RFL.

According to a second aspect of this invention, the halogenated butyl rubber is preferably brominated butyl rubber (Br-IIR). The composition containing brominated butyl rubber forms a layer showing a particularly firm adhesion to a polyamide or polyester resin layer at a high temperature. Although no definite reason is known as yet, it is considered that the bromine which the rubber contains may have some effect or other on the vulcanization of the resin. Moreover, the use of rubber containing bromine makes it easier to produce a composition containing at least 0.5% by weight of bromine, thus providing a greater range of freedom in selecting APF or Br-APF, or a mixture thereof as the vulcanizing agent.

According to a third aspect of this invention, the resorcinol compound is resorcinol, or another compound containing a resorcinol structure at each end of its molecule. The composition containing any such compound forms a layer showing a particularly firm adhesion to a polyamide or polyester resin layer at a high temperature.

According to a fourth aspect of this invention, the composition further comprises not more than 5 parts by weight of at least one of methylol melamine and hexamethylene tetramine per 100 parts by weight of the base material. It forms a layer showing a still improved adhesion to a polyamide or polyester resin layer. A composition containing a larger amount of methylol melamine or hexamethylene tetramine than the limit given above is likely to have a greater compression set upon vulcanization and a hose formed of this composition is likely to fail to make a tightly sealed joint with another pipe.

According to a fifth aspect of this invention, there is provided a laminate comprising a rubber layer formed of any composition according to this invention as set forth above, and a polyamide or polyester resin layer bonded to the rubber layer by vulcanization. The rubber layer maintains a high adhesion to the resin layer, as stated above.

According to a sixth aspect of this invention, the resin layer is preferably of a polyamide resin, or a resin mixture consisting of 50 to 100% by volume of a polyamide resin and 0 to 50% by volume of a modified polyolefin resin. The polyamide resin may contain ε-caprolactam. The modified polyolefin resin is a polyolefin resin modified by its graft polymerization with an unsaturated carboxylic acid or a monomer derived therefrom. The rubber layer maintains a particularly firm adhesion to the resin layer consisting or, or containing a polyamide resin.

According to a seventh aspect of this invention, there is provided a fluid-impermeable hose having a wall formed of an inner layer, an outer layer and a reinforcing layer disposed therebetween, its inner layer being a laminate of rubber and resin layers according to the fifth or sixth aspect of this invention as set forth above. The hose can be installed in, for example, the engine compartment of an automobile as a refrigerant hose in its air-conditioning system without causing any problem, as the two layers forming the laminate remain firmly adhered to each other even at a high temperature and do not allow any refrigerant gas to collect therebetween and cause their separation from each other.

The above and other features and advantages of this invention will become more apparent from the following description and the accompanying drawing.

DETAILED DESCRIPTION OF THE INVENTION

Figure 1:
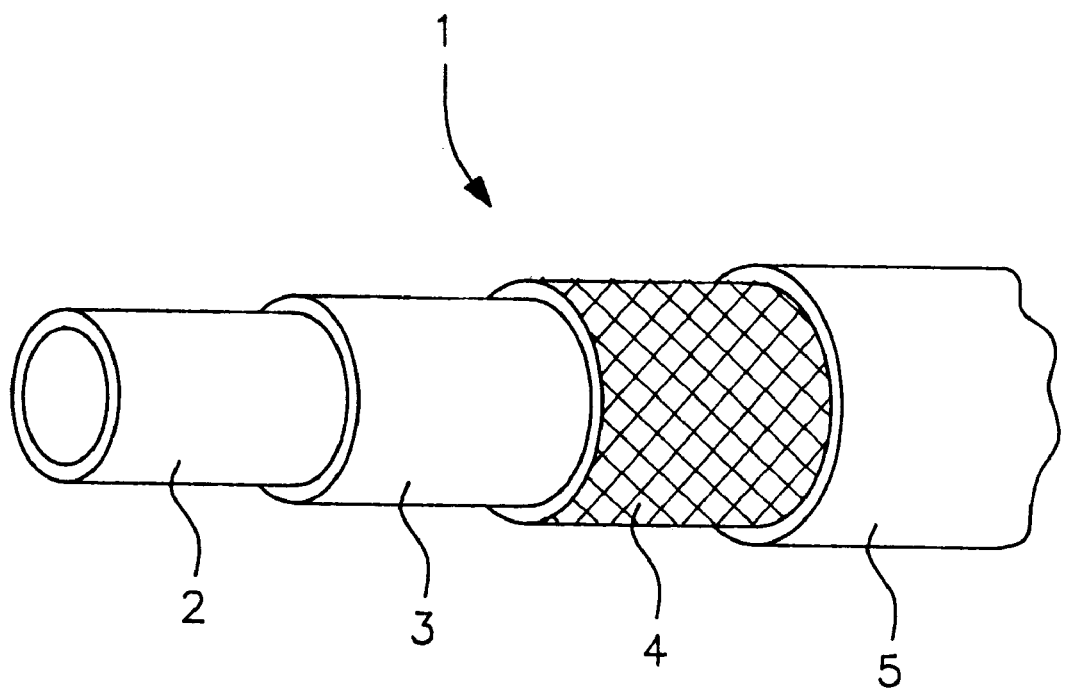
FIG. 1 is a partly cutaway perspective view of a fluid impermeable hose embodying this invention.

Rubber Composition:

The rubber composition of this invention may further contain any known or common additive not mentioned above if it does not adversely affect this invention or any of its advantages. Examples of such additives include carbon black, process oil and an antioxidant.

The base material of the rubber composition comprises butyl rubber (IIR), or halogenated butyl rubber, such as brominated butyl rubber (Br-IIR) or chlorinated butyl rubber (Cl-IIR), or a mixture thereof. Br-IIR, or a mixture containing it in a large proportion is, among others, preferred.

The composition also contains 0.5 to 5 parts by weight of a resorcinol compound, or a mixture of two or more such compounds. The preferred compounds are resorcinol, and a compound containing a resorcinol structure at each end of its molecule, such as Compound 1 or 2 shown below.

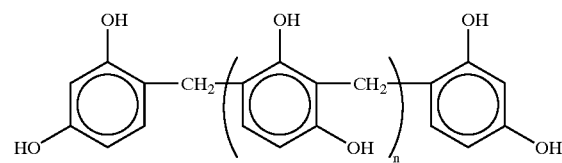

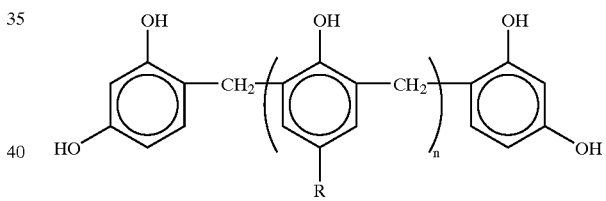

The composition further contains 3 to 15 parts by weight of an alkylphenol-formaldehyde resin (APF), or a brominated alkylphenol-formaldehyde resin (Br-APF), or a mixture thereof as the vulcanizing agent per 100 parts by weight of rubber.

It is important for the composition of this invention to contain a total of at least 0.5% by weight of bromine, whether it may contain Br-IIR as rubber, or Br-APF as the vulcanizing agent. The composition may contain any other substance containing bromine, in addition to Br-IIR or Br-APF.

The rubber composition of this invention may further contain not more than five parts by weight of an adhesion promotor, containing at least one type of either formaldehyde or a formaldehyde donor per 100 parts by weight of rubber. Preferred examples of the adhesion promotor include methylol melamine and hexamethylene tetramine, which are methylene donors. A preferred form of methylol melamine is shown as Compound 3 below. In the formula, R stands for a hydrogen atom, or a methyl group.

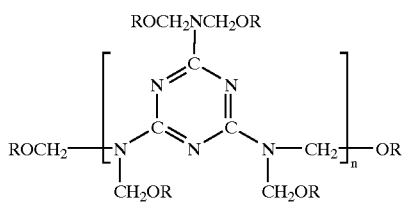

Hydrated silica is another preferred adhesion promotor. The composition may contain not more than, say, 30 parts by weight of hydrated silica per 100 parts by weight of rubber. The adhesion promotor enables a layer of the rubber composition to adhere still more firmly to a polyamide or polyester resin layer. A composition containing a larger amount of adhesion promotor than stated above is likely to have a greater compression set upon vulcanization and fail to make a hose having a tightly sealed joint with another pipe.

Laminate of Rubber and Resin Layers:

The laminate of rubber and resin layers according to this invention is produced by bonding a layer of the rubber composition according to this invention to a polyamide or polyester resin layer, while vulcanizing it.

The polyamide resin layer is preferably of polyamide 6, polyamide 66, polyamide 610, polyamide 612, polyamide 11, polyamide 12, or an aromatic polyamide, or a mixture of two or more such resins. Another preferred layer is of a mixture containing a polyamide resin and not more than 50% by volume of a polyolefin resin modified by its graft polymerization with an unsaturated carboxylic acid or a monomer derived therefrom. Still another preferred layer is of a resin containing ε-caprolactam. While the amount of ε-caprolactam to be added is not basically limited, it is preferable from an adhesion standpoint for its amount not to exceed 10 parts by weight per 100 parts by weight of a polyamide resin, or a mixture of polyamide and modified polyolefin resins.

Preferable examples of the polyester resin layer include polyethylene terephthalate (PET), polybutylene terephthalate (PBT), polyethylene naphthalate (PEN) or polybutylene naphthalate (PBN). It may also be of a mixture of two or more such resins.

Fluid-Impermeable Hose:

The fluid-impermeable hose according to this invention has its wall formed of an inner layer, an outer layer and a reinforcing layer disposed therebetween, and the inner layer is formed of a laminate of an inner resin layer and an outer rubber layer according to this invention. Although the outer wall and reinforcing layers of the hose may be of any appropriate material and construction, the outer wall layer is preferably of rubber of high weatherability, such as ethylene-propylene-diene rubber (EPDM), butyl rubber (IIR), chloroprene rubber (CR) or chlorosulfonated polyethylene rubber (CSM). The reinforcing layer is preferably a layer of braided wire, a layer formed by braiding reinforcing yarn, a double layer formed by winding reinforcing yarn spirally in two opposite directions, or a combination of such a double layer and an intermediate rubber layer held between the two spirally wound yarn layers.

Specific Example of a Fluid-Impermeable Hose:

A specific example of a fluid-impermeable hose embodying this invention is shown as 1 in FIG. 1, and its wall has a resin layer 2 forming its innermost layer, a rubber layer 3, a reinforcing layer 4 and an outer layer 5. The resin layer 2 is of a polyamide resin containing ε-caprolactam. The rubber layer 3 is of a composition containing Br-IIR, resorcinol and APF, and having a total bromine content of at least 0.5% by weight. The reinforcing layer 4 is of braided reinforcing yarn. The outer layer 5 is of EPDM. The resin and rubber layers 2 and 3 is formed as a laminate thereof.

The hose can be manufactured by any known process, for example, a process including the following steps:

(1) The innermost polyamide resin layer is extruded in tubular form onto a mandrel;
(2) An unvulcanized rubber layer is formed from a composition containing Br-IIR in tubular form about the polyamide resin layer coaxially therewith;
(3) The reinforcing layer is formed by braiding reinforcing yarn about the rubber layer;
(4) Unvulcanized EPDM is applied about the reinforcing layer, and vulcanized to form the outer layer, whereby a fluid-impermeable hose is obtained; and
(5) The hose is removed from the mandrel.

EXAMPLES

The invention will now be described in further detail by way of more specific examples.

Preparation of Unvulcanized Rubber Compositions:

Unvulcanized rubber compositions according to Examples 1 to 16 embodying this invention and Comparative Examples 1 to 10 were prepared by mixing the materials in the proportions shown in Tables 1 to 7. Each composition was so prepared as to further contain 5 phr (parts per hundred parts of rubber) of zinc oxide, 1 phr of stearic acid, 50 phr of FEF carbon and 5 phr of paraffin oil, though they are not shown in the tables.

In each table, the resorcinol resin is a Compound 2 in which the n in the formula=0 to 3. Each table also shows the bromine (Br) content of each corresponding rubber composition in percentage by weight. It also shows the scorch time of the composition in minutes as determined by an ordinary scorch test. A preferable scorch time is not shorter than 20 minutes.

Evaluation of the Compositions for Physical Properties and Compression Set:

A sheet having a thickness of 2 mm was formed by pressing at 160° C. for 45 minites from the unvulcanized rubber composition of each Example or Comparative Example. An appropriately shaped testpiece was prepared by stamping from each such sheet, and was examined for its tensile strength at break (MPa) and its elongation at break (%) in accordance with the JIS K 6301 procedures.

A solid circular body having a diameter of 29 mm and a height of 13 mm was also formed from each unvulcanized rubber composition, and vulcanized in a die by pressing at 160° C. for 45 minites to prepare a solid circular specimen having a diameter of 29 mm and a height of 12.7 mm. Each such specimen was held at a temperature of 80° C. for 22 hours, and examined for its compression set (%) in accordance with the JIS K 6301 procedures.

The results are shown in Tables 1 to 6. Preferred standards for evaluation are a tensile strength of at least 10 MPa, an elongation of at least 200% and a compression set not exceeding 40%.

Evaluation for Adhesion to a Resin:

A 100 mm square sheet having a thickness of 2.2 mm was formed from each unvulcanized rubber composition. It was placed on a strip of a polyamide resin having a thickness of 0.15 mm, a width of 50 mm and a length of 100 mm, and vulcanized by pressing at 160° C. for 45 minutes to prepare a laminate of rubber and resin layers for an adhesion test.

A testpiece having a width of 20 mm and a length of 100 mm was cut from each such laminate after its cooling to room temperature. Each testpiece had its rubber layer fixed to a tensile testing machine conforming to the requirements of JIS B 7721, and its resin layer was pulled from the rubber layer at a rate of 50 mm per minute for measuring its adhesive strength (N/mm). The adhesion test of each laminate was conducted in two different environments having different temperatures, i.e. 25° C. and 80° C., the temperature to which a refrigerant hose for an automobile air-conditioning system would be exposed in an engine compartment. The results are shown in Tables 1 to 6. A preferred standard for evaluation is an adhesive strength of at least 1 N/mm at 80° C.

The adhesion test was accompanied by the examination of the rubber and resin layers for their condition after the test. The results are shown in the tables by symbols, i.e. a circle indicating that the rubber layer had been broken by its separation from the resin layer, a triangle indicating that the rubber layer had been partly broken, and an x indicating that the rubber layer had not been broken.

Evaluation for Adhesion to Reinforcing Yarn:

A 100 mm square sheet having a thickness of 2.2 mm was formed from each unvulcanized rubber composition according to Example 1 or 12, or Comparative Example 8. It was placed on a layer of a reinforcing yarn which had been formed by winding it tightly in one direction about a 100 mm square flexible metal sheet having a thickness of 2 mm, while the wound turns of the yarn had been bundled together closely at one end of the layer to form a grip portion to be held for a tensile adhesion test. The rubber sheet was vulcanized by pressing at 160° C. for 45 minutes to form a rubber layer adhering to the yarn layer. The yarn layer was cut, and after the metal sheet had been removed therefrom, the rubber and yarn assembly was cooled down to room temperature. Then, it was cut into a testpiece for an adhesion test including the grip portion and having a width of 25 mm and a length of 100 mm. It had its rubber layer fixed to a tensile testing machine conforming to JIS B 7721, and had its yarn layer pulled from the rubber layer at a rate of 50 mm per minute for measuring its adhesive strength (N/mm). The results are shown in Table 7. Each adhesion test was accompanied by the examination of the rubber and yarn layers for their condition after the test. The results are shown in Table 7 by symbols, i.e. a circle indicating that the rubber layer had been broken by its separation from the yarn layer, a triangle indicating that the rubber layer had been partly broken, and an x indicating that the rubber layer had not been broken.

Summary of the Results:

(1) As is obvious from the tables, particularly Table 1, every rubber composition not containing bromine shows only a very low adhesive strength Every composition containing less than 0.5% by weight of bromine has a low adhesive strength, at least at an elevated temperature.

(2) As is obvious from Table 2, every rubber composition containing Br-IIR or a mixture containing it shows a high adhesive strength at an elevated temperature if it has a total bromine content of at least 0.5% by weight.

(3) As is obvious from Table 3, every rubber composition containing Br-IIR, IIR or a mixture thereof shows a high adhesive strength at an elevated temperature if it contains a Br-APF resin as the vulcanizing agent and thereby has a total bromine content of at least 0.5% by weight.

(4) As is obvious from Table 4, the composition containing less than 0.5 part by weight of an adhesive material (resorcinol or a resorcinol resin) shows a very low adhesive strength and the composition containing more than five parts by weight thereof has too short a scorch time, though it may be satisfactory in adhesive strength.

(5) As is obvious from Table 5, the addition of an appropriate amount of hexamethylene tetramine or methylol melamine as an adhesion promotor further improves the adhesive property of the rubber composition, but its excessive addition results in a composition having an undesirably high compression set after vulcanization.

(6) As is obvious from Table 6, the addition of hydrated silica as an adhesion promotor still further improves the adhesive property of the rubber composition.

(7) As is obvious from Table 7, the rubber composition of Example 1 or 12 containing a resorcinol resin as an adhesive material in the amount falling within the range of 0.5 to 5 parts by weight according to this invention shows a by far higher adhesive property to reinforcing yarn than that of Comparative Example 8 containing only 0.1 part by weight of resorcinol resin.

TABLE 1

|  | Example 1 | Comparative Example 1 | Comparative Example 2 |
|---|---|---|---|
| Br-IIR | 100 | — | — |
| Cl-IIR | — | 100 | — |
| IIR | — | — | 100 |
| Resorcinol resin | 3 | 3 | 3 |
| APF resin | 7 | 7 | 7 |
| Br content (%) | 1.17 | 0 | 0 |
| Scorch time (min) | 24 | 20 | 45< |
| Tensile strength at break (MPa) | 12.4 | 12.4 | 7.8 |
| Elongation at break (%) | 330 | 330 | 500< |
| Compression set (%) | 20 | 21 | 49 |
| Adhesive strength at 25° C. (N/mm) | 5.4 | 0.3 | 0.2 |
| Face after adhension test | ○ | X | X |
| Adhesive strength at 80° C. (N/mm) | 2.5 | 0.2 | 0.1 |
| Face after adhension test | ○ | X | X |

TABLE 2

|  | Example 1 | Example 2 | Example 3 | Example 4 | Example 5 | Comparative Example 2 | Comparative Example 3 |
|---|---|---|---|---|---|---|---|
| Br-IIR | 100 | 80 | 60 | 50 | 50 | 40 | — |
| Cl-IIR | — | — | — | — | 50 | — | — |

TABLE 2-continued

|  | Example 1 | Example 2 | Example 3 | Example 4 | Example 5 | Comparative Example 2 | Comparative Example 3 |
|---|---|---|---|---|---|---|---|
| IIR | — | 20 | 40 | 50 | — | 60 | 100 |
| Resorcinol resin | 3 | 3 | 3 | 3 | 3 | 3 | 3 |
| APF resin | 7 | 7 | 7 | 7 | 7 | 7 | 7 |
| Br content (%) | 1.17 | 0.94 | 0.70 | 0.58 | 0.58 | 0.47 | 0 |
| Scorch time (min) | 24 | 28 | 29 | 32 | 23 | 35 | 45< |
| Tensile strength at break (MPa) | 12.4 | 12.5 | 12.1 | 12.1 | 12 | 11.9 | 7.8 |
| Elongation at break (%) | 330 | 360 | 400 | 420 | 310 | 470 | 500< |
| Compression set (%) | 20 | 22 | 23 | 26 | 19 | 28 | 49 |
| Adhesive strength at 25° C. (N/mm) | 5.4 | 4.8 | 4.6 | 3.9 | 3.7 | 3.2 | 0.2 |
| Face after adhension test | ○ | ○ | ○ | ○ | ○ | ○ | X |
| Adhesive strength at 80° C. (N/mm) | 2.5 | 2.2 | 1.9 | 1.4 | 1.3 | 0.9 | 0.1 |
| Face after adhension test | ○ | ○ | ○ | ○ | ○ | Δ | X |

TABLE 3

|  | Example 1 | Example 6 | Example 7 | Example 8 | Example 9 | Comparative Example 4 | Comparative Example 5 | Comparative Example 6 | Comparative Example 7 |
|---|---|---|---|---|---|---|---|---|---|
| Br-IIR | 100 | 50 | 50 | 100 | 100 | 50 | 50 | 0 | 100 |
| IIR | — | 50 | 50 | — | — | 50 | 50 | 100 | — |
| Resorcinol resin | 3 | 3 | 3 | 3 | 3 | 3 | 3 | 3 | 3 |
| APF resin | 7 | — | — | 4 | 15 | — | — | — | 16 |
| Br-APF resin | — | 4 | 15 | — | — | 3 | 16 | 15 | — |
| Br content (%) | 1.17 | 0.71 | 0.98 | 1.19 | 1.12 | 0.69 | 1.00 | 0.42 | 1.11 |
| Scorch time (min) | 24 | 29 | 21 | 28 | 22 | 31 | 18 | 45< | 19 |
| Tensile strength At break (MPa) | 12.4 | 10.3 | 12.4 | 10.2 | 12.4 | 9.5 | 12.2 | 8.8 | 12.8 |
| Elongation at break (%) | 330 | 410 | 320 | 420 | 290 | 410 | 300 | 500< | 280 |
| Compression set (%) | 20 | 30 | 21 | 29 | 18 | 33 | 20 | 42 | 18 |
| Adhesive strength at 25° C. (N/mm) | 5.4 | 3.2 | 4.1 | 4.8 | 4.9 | 3.6 | 4.0 | 0.8 | 4.8 |
| Face after adhension test | ○ | ○ | ○ | ○ | ○ | ○ | ○ | X | ○ |
| Adhesive strength at 80° C. (N/mm) | 2.5 | 1.6 | 1.9 | 2.2 | 1.9 | 1.2 | 1.7 | 0.1 | 2.1 |
| Face after adhension test | ○ | ○ | ○ | ○ | ○ | ○ | ○ | X | ○ |

TABLE 4

|  | Example 1 | Example 10 | Example 11 | Example 12 | Comparative Example 8 | Comparative Example 9 |
|---|---|---|---|---|---|---|
| Br-IIR | 100 | 100 | 100 | 100 | 100 | 100 |
| Resorcinol | — | 3 | — | — | — | — |
| Resorcinol resin | 3 | — | 0.5 | 5 | 0.1 | 6 |
| APF resin | 7 | 7 | 7 | 7 | 7 | 7 |
| Br content (%) | 1.17 | 1.17 | 1.19 | 1.16 | 1.19 | 1.15 |
| Scorch time (min) | 24 | 22 | 28 | 20 | 30 | 18 |
| Tensile strength at break (MPa) | 12.4 | 12.2 | 12.1 | 12.5 | 12.2 | 12.3 |
| Elongation at break (%) | 330 | 350 | 350 | 300 | 360 | 280 |
| Compression set (%) | 20 | 22 | 22 | 19 | 22 | 18 |
| Adhesive strength at 25° C. (N/mm) | 5.4 | 5.1 | 4.2 | 4.5 | 0.9 | 3.9 |
| Face after adhension test | ○ | ○ | ○ | ○ | X | ○ |
| Adhesive strength at 80° C. (N/mm) | 2.5 | 2.3 | 1.9 | 2.4 | 0.3 | 2.2 |
| Face after adhension test | ○ | ○ | ○ | ○ | X | ○ |

TABLE 5

|  | Example 1 | Example 13 | Example 14 | Example 15 | Comparative Example 10 |
|---|---|---|---|---|---|
| Br-IIR | 100 | 100 | 100 | 100 | 100 |
| Resorcinol resin | 3 | 3 | 3 | 3 | 3 |
| APF resin | 7 | 7 | 7 | 7 | 7 |
| Hexamethylene tetramine | — | 3 | 5 | — | 6 |
| Methylol melamine | — | — | — | 3 | — |
| Br content (%) | 1.17 | 1.15 | 1.14 | 1.15 | 1.13 |
| Scorch time (min) | 24 | 27 | 33 | 20 | 35 |
| Tensile strength at break (MPa) | 12.4 | 11.9 | 11.8 | 11.8 | 10.7 |
| Elongation at break (%) | 330 | 380 | 410 | 370 | 440 |
| Compression set (%) | 20 | 25 | 39 | 26 | 42 |
| Adhesive strength at 25° C. (N/mm) | 5.4 | 4.1 | 4.3 | 3.9 | 5.1 |
| Face after adhension test | ○ | ○ | ○ | ○ | ○ |
| Adhesive strength at 80° C. (N/mm) | 2.5 | 2.4 | 2.4 | 2.2 | 2.2 |
| Face after adhension test | ○ | ○ | ○ | ○ | ○ |

TABLE 6

|  | Example 1 | Example 16 |
|---|---|---|
| Br-IIR | 100 | 100 |
| Resorcinol resin | 3 | 3 |
| APF resin | 7 | 7 |
| Hydrated silica | — | 10 |
| Br content (%) | 1.17 | 1.10 |
| Scorch time (min) | 24 | 27 |
| Tensile strength at break (MPa) | 12.4 | 11.8 |
| Elongation at break (%) | 330 | 360 |
| Compression set (%) | 20 | 25 |
| Adhesive strength at 25° C. (N/mm) | 5.4 | 6.5 |
| Face after adhension test | ○ | ○ |
| Adhesive strength at 80° C. (N/mm) | 2.5 | 2.9 |
| Face after adhension test | ○ | ○ |

TABLE 7

|  | Example 1 | Example 12 | Comparative Example 8 |
|---|---|---|---|
| Br-IIR | 100 | 100 | 100 |
| Resorcinol resin | 3 | 5 | 0.1 |
| APF resin | 7 | 7 | 7 |
| Br content (%) | 1.17 | 1.16 | 1.19 |
| Scorch time (min) | 24 | 20 | 30 |
| Adhesive strength (N/mm) | 2.4 | 2.6 | 0.9 |
| Face after adhension test | ○ | ○ | x |

While the invention has been described by way of its preferred embodiments, it is to be understood that variations or modifications may be easily made by those skilled in the art without departing from the scope of this invention which is defined by the appended claims.

What is claimed is:

1. A rubber composition comprising halogenated butyl rubber or a mixture of halogenated butyl rubber and butyl rubber as a base material, 0.5 to 5 parts by weight of at least one resorcinol compound as an adhesive material per 100 parts by weight of the base material, and 3 to 15 parts by weight of at least one vulcanizing agent selected from the group consisting of alkylphenol-formaldehyde and brominated alkylphenol-formaldehyde resins per 100 parts by weight of the base material, wherein said composition contains at least 0.5% by weight of bromine.

2. A composition as set forth in claim 1, wherein said halogenated butyl rubber is brominated butyl rubber.

3. A composition as set forth in claim 1, wherein said base material is brominated butyl rubber.

4. A composition as set forth in claim 1, further comprising a bromine-containing compound other than said halogenated butyl rubber and said brominated alkylphenol-formaldehyde resin.

5. A composition as set forth in claim 1, further comprising a member selected from the group consisting of carbon black, process oil, and an antioxidant.

6. A composition as set forth in claim 1, wherein said resorcinol compound is resorcinol, or a compound containing a resorcinol structure at each end of its molecule.

7. A composition as set forth in claim 1, further comprising at least formaldehyde or a formaldehyde donor as an adhesion promotor.

8. A composition as set forth in claim 7, wherein the content of said adhesion promotor is not more than five parts by weight per 100 parts by weight of the base material.

9. A composition as set forth in claim 7, wherein said donor comprises at least methylol melamine or hexamethylene tetramine.

10. A composition as set forth in claim 1, further comprising 30 parts by weight of hydrated silica as an adhesion promotor per 100 parts by weight of the base material.

11. A laminate of a rubber layer formed of a composition as set forth in claim 1, and a polyamide resin layer bonded to said rubber layer by its vulcanization.

12. A laminate as set forth in claim 11, wherein said polyamide resin layer is of a mixture containing 50 to 100% by volume of a polyamide resin and 0 to 50% by volume of a polyolefin resin modified by its graft polymerization with an unsaturated carboxylic acid or a monomer derived therefrom.

13. A laminate as set forth in claim 11, wherein said polyamide resin layer is of a resin selected from the group consisting of polyamide 6, polyamide 66, polyamide 610, polyamide 612, polyamide 11, polyamide 12, an aromatic polyamide resin, and a mixture thereof.

14. A laminate as set forth in claim 11, wherein said polyamide resin layer contains ε-caprolactam.

15. A laminate of a rubber layer formed of a composition as set forth in claim 1, and a polyester resin layer bonded to said rubber layer by its vulcanization.

16. A laminate as set forth in claim 15, wherein said polyester resin layer is of a resin selected from the group consisting of polyethylene terephthalate, polybutylene terephthalate, polyethylene naphthalate, polybutylene naphthalate, and a mixture thereof.

17. A fluid-impermeable hose having a wall comprising an inner layer formed of a laminate as set forth in claim 11, a reinforcing layer surrounding said inner layer, and an outer layer surrounding said reinforcing layer, said inner layer having its inner layer formed of said resin layer and its outer layer formed of said rubber layer.

18. A hose as set forth in claim 17, wherein said outer layer of said wall is of rubber selected from the group consisting of ethylene-propylene-diene rubber, butyl rubber, chloroprene rubber and chlorosulfonated polyethylene rubber.

19. A hose as set forth in claim 17, wherein said reinforcing layer is a layer selected from the group consisting of a layer of braided wire, a layer formed of braided reinforcing yarn, a double layer formed by winding reinforcing yarn spirally in two opposite directions, and a combination of such a double layer and an intermediate rubber layer held between the two spirally wound yarn layers.

20. A hose as set forth in claim 17, wherein said hose is a refrigerant hose for an air-conditioning system.

* * * * *